(12) United States Patent
Allen et al.

(10) Patent No.: US 8,112,391 B2
(45) Date of Patent: Feb. 7, 2012

(54) SYNCHRONIZATION OF AGENT SKILL DATA

(75) Inventors: Christopher J. Allen, Aurora, CO (US); Beth S. Miles Barry, Corte Madera, CA (US); Ervan D. Rodgers, Lansing, MI (US)

(73) Assignee: Accenture Global Services GmbH, Schaffhausen (CH)

( * ) Notice: Subject to any disclaimer, the term of this patent is extended or adjusted under 35 U.S.C. 154(b) by 195 days.

(21) Appl. No.: 10/619,917

(22) Filed: Jul. 15, 2003

(65) Prior Publication Data

US 2006/0123060 A1    Jun. 8, 2006

(51) Int. Cl.
  *G06F 7/00* (2006.01)
  *G06F 17/00* (2006.01)
  *H04M 3/00* (2006.01)
  *H04M 5/00* (2006.01)

(52) U.S. Cl. .............. 707/624; 707/618; 379/265.06; 379/265.12; 379/266.01

(58) Field of Classification Search ............. 379/265.05, 379/242, 265.01, 266.01, 265.12, 265.06; 707/200, 624, 618, 610, 609
See application file for complete search history.

(56) References Cited

U.S. PATENT DOCUMENTS

| | | | | |
|---|---|---|---|---|
| 5,633,924 A * | 5/1997 | Kaish et al. | ............... | 379/266.03 |
| 6,128,380 A * | 10/2000 | Shaffer et al. | ............ | 379/265.01 |
| 6,453,038 B1 * | 9/2002 | McFarlane et al. | ....... | 379/265.05 |
| 6,493,447 B1 * | 12/2002 | Goss et al. | ............... | 379/265.09 |
| 6,690,788 B1 * | 2/2004 | Bauer et al. | .................... | 379/242 |
| 6,704,410 B1 * | 3/2004 | McFarlane et al. | ....... | 379/265.05 |
| 6,785,741 B1 * | 8/2004 | Mandalia et al. | ............. | 719/328 |
| 6,901,380 B1 * | 5/2005 | Bremers | .......................... | 705/27 |
| 7,219,304 B1 * | 5/2007 | Kraenzel et al. | .............. | 715/755 |
| 2004/0028213 A1 * | 2/2004 | Goss | ........................ | 379/265.09 |

FOREIGN PATENT DOCUMENTS

| | | |
|---|---|---|
| EP | 0 982 915 A | 3/2000 |
| EP | 1 107 556 A | 6/2001 |
| GB | 2 339 643 A | 2/2000 |
| WO | WO 99/00966 A | 1/1999 |

OTHER PUBLICATIONS

Pickett, Joseph P., The American Heritage College Dictionary, 2002, Houghton Mifflin Company, Fourth Ed., cover pages + p. 361.*

* cited by examiner

*Primary Examiner* — Brent Stace
(74) *Attorney, Agent, or Firm* — Finnegan, Henderson, Farabow, Garrett & Dunner, LLP

(57) ABSTRACT

A method and system for automatically updating and synchronizing contact center agent skill data maintained in a central agent skill database with a routing system based upon skill-changing events triggered in skill-Impacting systems. Contact center agent skills may be maintained in a skill database for a set of agents. A skill-impacting system (such as an education system, a satisfaction system or a metrics system) may send skill/capability data for an agent. The agent's profile in the skill database may be updated based on the received skill data. Either immediately, when triggered by an event, or at a predetermined interval, a routing system's routing logic may be synchronized with the new data in the agent's profile. When the contact center receives a contact (such as a phone call, an email, a web chat, an instant message, or a fax) from a customer, processing logic in the routing system may select a best-fit agent based on availability and skill data from the agent profiles.

33 Claims, 7 Drawing Sheets

| Skill Type | Skill | Proficiency |
|---|---|---|
| Product Knowledge | Product A | 7 |
| | Product B | 7 |
| | Product C | 1 |
| Services Knowledge | Service A | 1 |
| | Service B | 1 |
| | Service C | 1 |
| Value Segment Treatment | Customer Segment A | 1 |
| | Customer Segment B | 1 |
| | Customer Segment C | 1 |
| | Customer Segment D | 7 |
| Business Function | Credit & Collections | 1 |
| | Sales | 7 |
| | Customer Service | 1 |
| | Technical Support | 1 |
| | Repair/Field Dispatch | 1 |
| Cross-Sell Offers | Offer A | 1 |
| | Offer B | 1 |
| | Offer C | 1 |

FIGURE 5

SYNCHRONIZATION OF AGENT SKILL DATA

BACKGROUND OF THE INVENTION

Contact centers are an important component used by businesses to maintain their relationships with customers. Contact centers were originally known as "call centers" since they enabled customers to communicate with customer service agents (also known as customer service representatives, CSRs, agents, reps, etc.) through in-bound or out-bound phone calls. With the introduction of other communication channels (such as email, fax, web chat, etc.), the term "contact centers" is now used since customers are not limited only to telephone calls as a point of contact. Throughout this document, the term call centers and contact centers will be used interchangeably. For ease of discussion, much of this document will explain agent performance platforms in terms of agents interacting with customers over the phone. Embodiments of the present invention are not limited only to telephone calls and call centers. Rather, embodiments of the present invention are applicable to all channels of communication handled by contact centers, including channels in use now as well as those channels developed in the future.

Contact centers are everywhere. In 2002, there were an estimated 65,000 contact centers in America, employing almost 7 million customer service agents. Such a large number of agents are employed because call centers are accessed heavily by customers. For example, each day one national bank receives 10,000 customer inquiries through its contact centers. Experts believe the use of contact centers will grow. As an indicator of estimated growth, one business advisory firm estimates that the market (worldwide) for technology components used to build contact centers totaled $4.1 billion in 2002 and may grow to $5.5 billion by the year 2007.

In the early days of call centers, a bank of agents waited at their phones and answered calls in a round-robin fashion; the first call of the shift would be answered by the first agent, the second call would be answered by the second agent, etc. A customer could not direct his or her call to a customer support agent who specialized in the customer's type of problem. Conversely, agents received all types of calls—from the elementary question to the most challenging problem. Newer agents faced too many calls that they could not resolve and expert agents could be bored by answering too many easy problems.

The routing of calls became a matter of increased importance to optimize the efficiency of a contact center. Since labor costs could represent upwards of 70% of a contact center's costs, efficient use of labor began to have a major bearing on a contact center's competitiveness. Contact centers sought means to direct each call to the best skilled agent who was available to take the customer's call to minimize "talk time" and to maximize agent productivity. Effective call routing helped to contain labor costs as well as to optimize a customer's experience resulting in higher customer satisfaction.

As contact centers became more robust, advanced switches were implemented to manage the incoming customer requests and to assign them to an agent based on a database of routing instructions. Agents were divided into a small number of groups. For example, one group might contain Spanish-speaking agents while a second group might contain agents to answer billing questions. A third group might contain agents to handle new accounts. Once the groups were assigned, a customer could be directed to the group that best matched his or her type of call.

Present-day contact centers offer more differentiation of calls, emails, web chats and the like. Agents are no longer limited to being a member of just one of a small number of groups—such as a sales group or a billing group. Now agents can be identified by a number of skills and abilities. For example, one agent can be known to have the skills of: Spanish-speaking, advanced hardware issues, intermediate software issues, mid-west region. In some systems, ratings for up to 20 skills (also known as capabilities) can be stored for each agent, with each skill having an associated rating (such as beginner, intermediate, or advanced). Other systems track more or fewer skills and allow different types of ratings.

In present-day contact centers, automated systems first identify the customer's need by use of telephone touchpad choices, parsing of keywords in a message, and/or retrieving information about the customer via caller-ID, account number, etc. The systems then quickly match agents having skills particularly suited to the customer's need and then the best-fit agent (based on skills, availability, etc.) is chosen. Of course, if an agent's skill profile is not accurately maintained or kept up-to-date, then the switching system cannot optimize agent productivity. Instead, customer calls will be matched to agents based on their outdated skill sets. Thus it is important for the information about an agent to be accurate and current.

Many of the current switching systems (either the ACD system or the CTI application) have an interface that is used by one or more agent supervisors or administrative personnel. Whenever an agent completes training or demonstrates a different level of skill, the supervisor must use the interface to update the agent's information. Inevitably, in a contact center with large numbers of agents, it is difficult for call center supervisors to manually maintain agent skill information and to keep the information up-to-date. The task of updating skills can be overly onerous or just not important enough for a supervisor to do as soon as a new skill is developed. Instead, the supervisor may wait weeks or months before changing an agent's ratings for his or her skills. During that time, the switching systems may route calls to agents not properly suited to handle the calls resulting in poorer agent productivity and reduced customer satisfaction.

Additionally, maintenance of skill-impacting information typically falls under the purview of multiple resources in the contact center operation. Training supervisors may be responsible for updating training systems to reflect course completion. A quality monitoring team may input monitoring results. Customer satisfaction assessments may be reviewed by supervisors, who also obtain insight into agent skill development by walking the floors of the contact center. Input from each of these individuals must find its way, whether haphazardly or in a coordinated fashion, to the routing/skill table administrator who can actually change skills and ratings in the routing tool.

SUMMARY OF THE INVENTION

In one embodiment of the present invention, there is a method for maintaining skills for agents of a contact center and synchronizing skills in a central database with a routing system. Agent profiles may be stored in a central skill database for a set of agents. A skill-impacting system (such as an education system, a satisfaction system or a metrics system) may send skill/capability data for an agent. The agent's profile in the central skill database may be updated based on the received skill data. Either immediately or at a predetermined interval, the routing system may be synchronized with the new data in the central skill database. When the contact center receives a contact (such as a phone call, an email, a web chat, an instant message, or a fax) from a customer, processing logic in the routing system may select a best-fit agent based on availability and skill data from the agent profiles. Other embodiments of the present invention operate differently to synchronize skill data.

It is an object of the invention to provide an automated system of updating a skill for a contact center agent. It is another object of the invention to provide a system to transform information from many different sources into rating data for an agent. It is yet another object of the invention to centralize the rating information for a group of agents outside of CTI or ACD hardware and software because CTI and ACD systems necessarily use and restrict access to internal data in order to optimize real-time management and routing of telephone calls. It is yet another object of the invention to carefully synchronize the internal data of the CTI or ACD hardware and software based on the centralized rating data.

BRIEF DESCRIPTION OF THE DRAWINGS

FIG. 5 is a conceptual diagram of an agent profile as stored in the system.

DETAILED DESCRIPTION OF THE INVENTION

Figure 1:
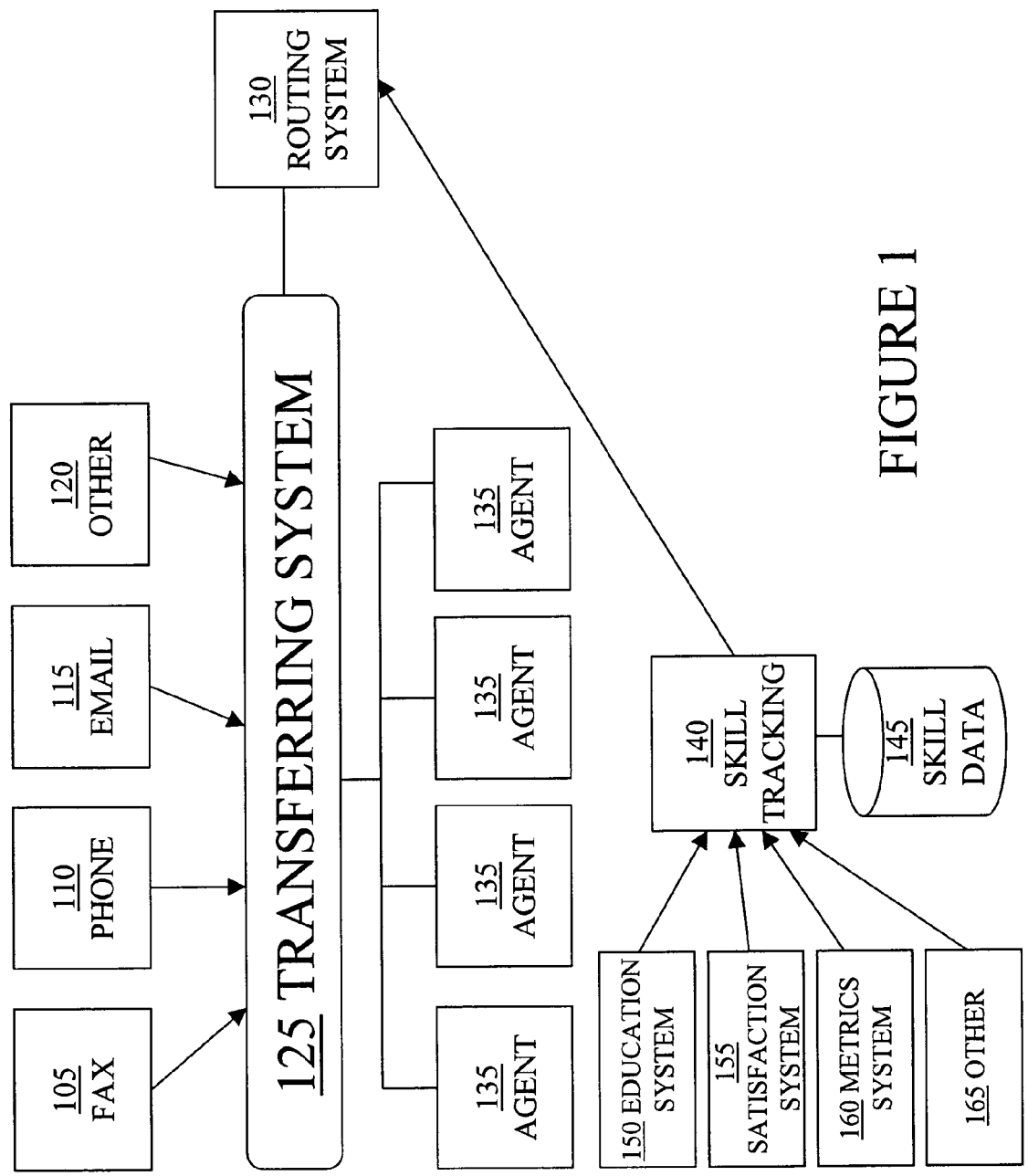
FIG. 1 is a diagram showing the automated updating of agent skills.

FIG. 1 is a diagram showing one conceptual embodiment of a system for maintaining skills for agents of a contact center and the automated updating of agent skills for a skill-based routing system within that contact center.

FIG. 1 shows how customers, potential customers, or other people may use fax machines 105, phones 110, email messages 115 or other systems (now known or developed in the future) 120 to contact a corporation, government group or other entity. A routing system 130 may use routing logic to determine which agent 135 should handle a particular contact. Routing logic may include rules and/or source data for determining the routing. In this document, the term routing logic also encompasses the source data used by the logic. This routing logic may use, among other factors, agent availability as a part of the routing decision. Furthermore, the routing system 130 may use agent capability/skill information (sometimes stored in a database as part of the agent's profile) to make the routing decisions. Once the routing is determined, the transferring system 125 may transfer the contact (such as a phone call, email message, web chat, web call-through, web call-back, paper-based correspondence converted to electronic form, fax or instant message, for example) to the proper agent 135.

In one embodiment, the transferring system 125 may be a PBX/ACD switch system sold by Avaya Inc. Other hardware and/or software may be used in other embodiments. For example, the transferring system 125 may also be a system sold by Aspect or Nortel. In one embodiment, the routing system 130 may be the AVAYA ADVOCATE system sold by Avaya Inc. The AVAYA ADVOCATE system may be deployed on-board the PBX/ACD transferring system 125. Or, the AVAYA ADVOCATE system may be separated from the transferring system 125. In other embodiments, systems sold by Genesys or Cisco may be used as the routing system 130, for example. The routing system 130 may include a database used to store agent profile and/or routing data.

To make the skill data in the routing system 130 more robust and up-to-date, a centralized skill tracking system 140 is implemented in one embodiment of the present invention. The skill tracking system 140 has, in one embodiment, a database 145 for storing the skill data for each agent 135. Skill data may be updated either manually or automatically by data sent from various skill-impacting systems. A learning management educational system 150, a call monitoring system, a customer satisfaction scoring system 155, a CRM application, a performance metrics system 160, a staff scheduling/forecasting system, a compensation management system, a knowledge management system, a custom-developed reporting system, an automatic call distributor system, a call management/reporting system, a computer telephone integration system, an interactive voice response system and other skill-impacting systems (now known or implemented in the future) 165 are some of the types of systems that can feed skill-impacting data to the skill tracking system 140. Skill-impacting data may be satisfaction assessments from completed customer contacts, completion or results of a training course, coaching outcomes, and/or performance metrics, such as if an agent's handle time is greater than a predetermined threshold. Of course, there are many other types of skill-impacting data and skill-impacting systems that can be used with the present invention.

As shown in FIG. 1, the skill tracking system 140 may be used (in one embodiment) to update and/or synchronize the skill-related data for an agent from the skill tracking system 140 to the routing system 130. Once data is updated to the routing system 130, routing decisions by the routing system 130 and/or the transferring system 125 may be improved.

FIG. 1 shows several types of systems that may submit skill-impacting data. Examples of a learning management educational system 150 include DOCENT ENTERPRISE developed by Docent, Inc. Examples of a call monitoring system include the eQUALITY software suite developed by Witness Systems, Inc. Examples of a customer satisfaction system 155 include applications of Conversant interactive voice response systems developed by Avaya. Examples of a CRM application include SIEBEL CALL CENTER developed by Siebel Systems, Inc. Examples of an agent performance metrics system 160 include Call Management System (CMS) developed by Avaya.

Figure 3:
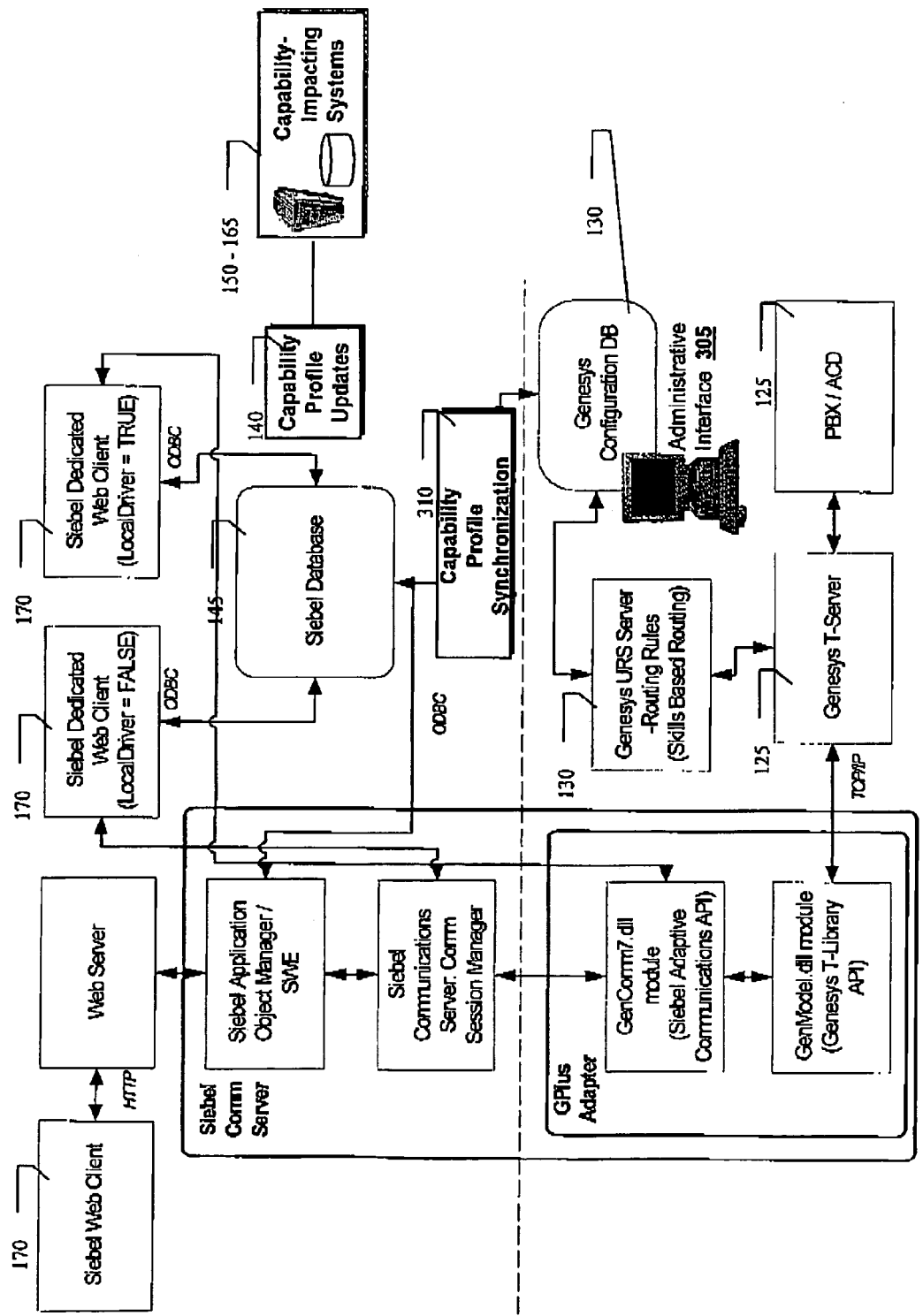
FIG. 3 is a diagram showing one embodiment of the present invention in a SIEBEL/GENESYS system.

While the system shown in FIG. 1 is highly abstracted, FIG. 3 shows one embodiment of implementing the present invention on a Siebel/Genesys architecture. Here, agents 135 have access to the system via a Siebel web client 170. The PBX/ACD 125 and T-Server 125 components are part of the transferring system 125 to transfer client contacts to the appropriate agent based on the routing system, which is implemented through a Genesys URS server 130 and a Genesys configuration database 130. The administrative interface 305 shown in FIG. 3 is the traditional way to input and update agent profiles (including skill levels of various agents) to the routing system 130. As shown in the figure, the capability-impacting systems (150, 155, 160 and 165) send skill-related data to the skill-tracking system of the capability profile update system 140 and the Siebel database 145. The Siebel database of FIG. 3 stores not only the data used by the Siebel CRM or ERM application, but also the skill-based data within agent profiles.

Figure 6:
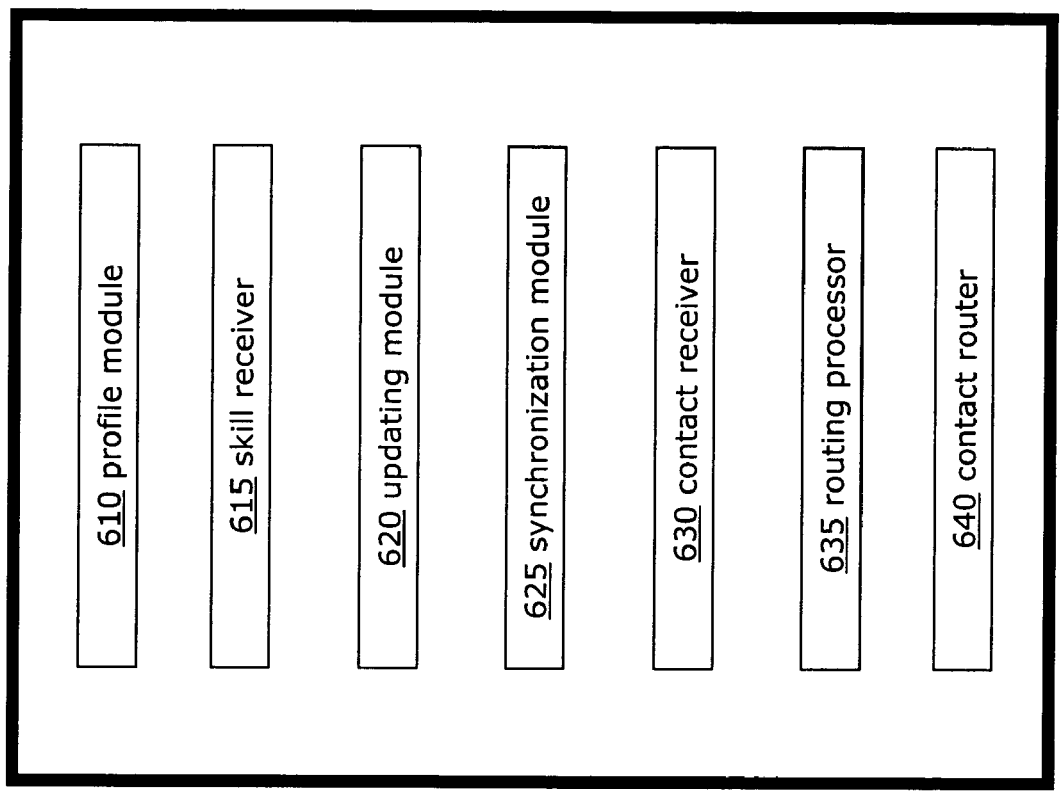
FIGS. 6 and 7 are diagrams showing two embodiments as systems of modular components.
Figure 7:
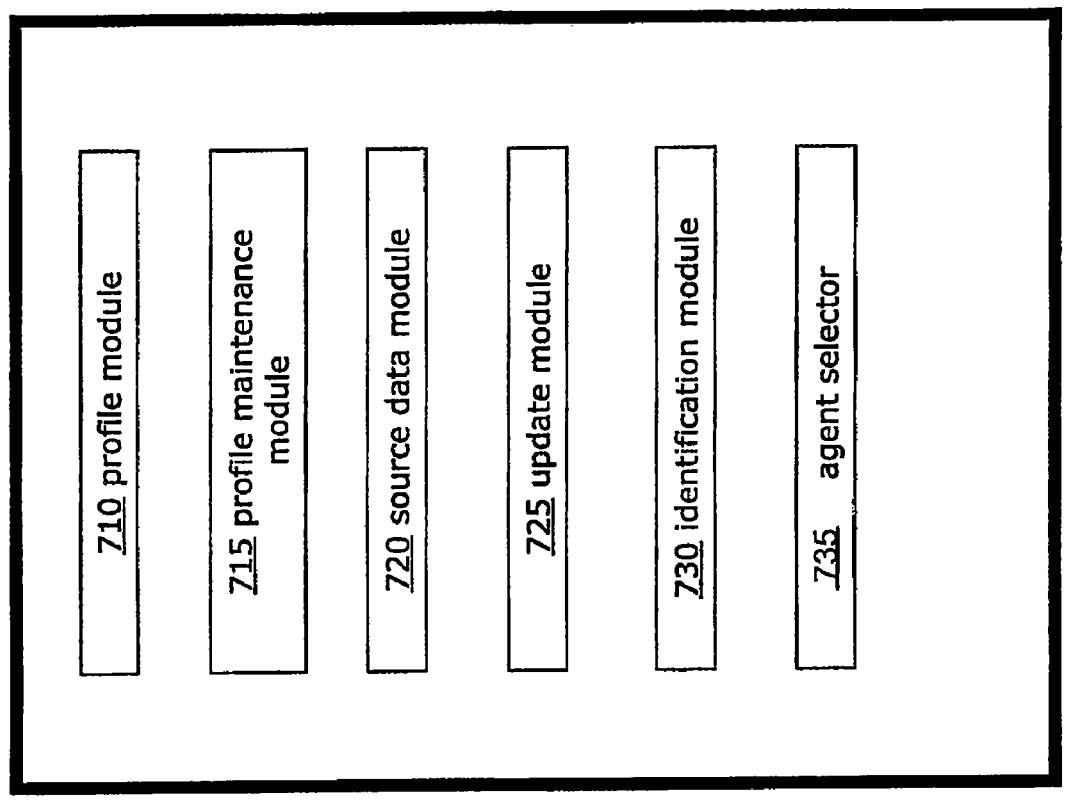

As one skilled in the art will understand, the various embodiments of the present invention can be implemented as a system of modular components and/or as a series of code segments of one or more computer programs stored on a computer-readable medium. The computer program code segments can be written in Java, C, C++, or any computer language now known or developed in the future. For a conceptual diagram of one embodiment of the invention as a system, refer to FIGS. 6 and 7, which represent a system with modular components including a profile module 610, a skill receiver 615, an updating module 620, a synchronization module 625, a contact receiver 630, a routing processor 635, and a contact router 640, and a system with modular components including a profile module 710, a profile maintenance module 715, a source data module 720, an update module 725, an identification module 730, and an agent selector 735.

Figure 4:
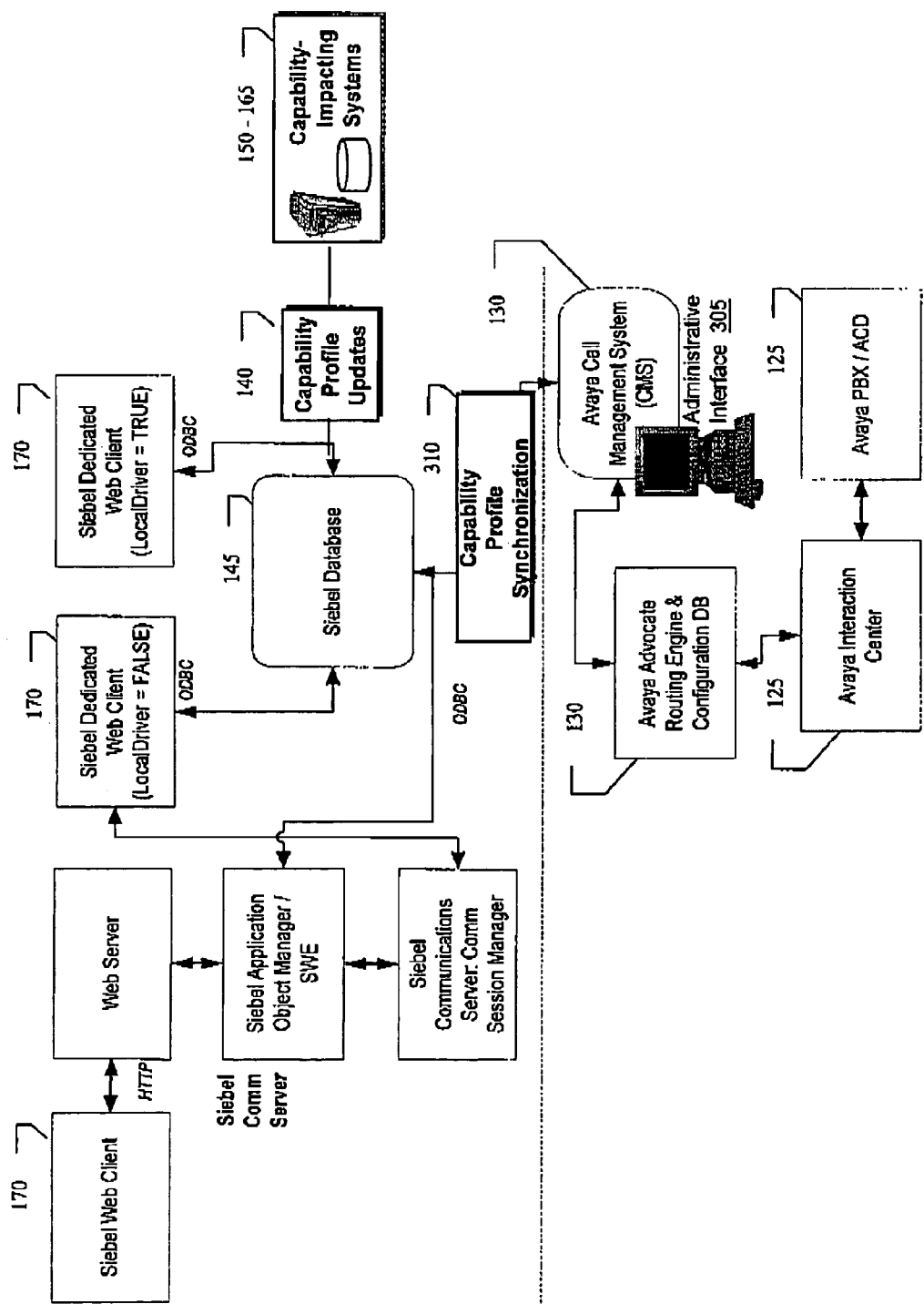
FIG. 4 is a diagram showing one embodiment of the present invention in a SIEBEL/AVAYA system.

Similar in many ways to FIG. 3, FIG. 4 is a diagram showing one embodiment of the present invention in a SIEBEL/AVAYA architecture framework. Here, the routing system 130 includes the AVAYA ADVOCATE routing engine and configuration database as well as the Avaya Call Management System. The transferring system 125 is the AVAYA PBX/ACD. Of course, other embodiments of the present invention could be made using other combinations of hardware, software and technical architectures.

Figure 2:
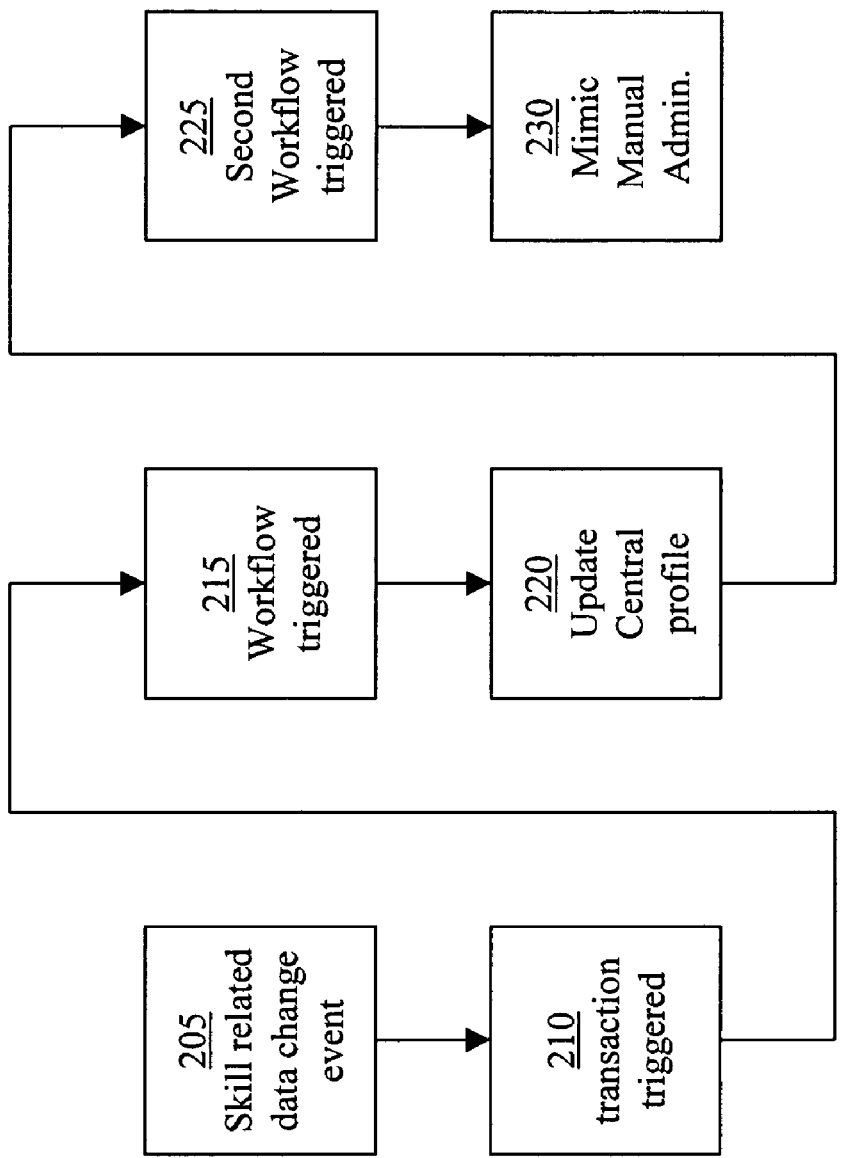
FIG. 2 is a flowchart of the updating of agent skills.

FIG. 2 is a high-level flowchart of one embodiment of providing the functionality of updating the capability profile 140 and then synchronizing 310 the data in the routing system. When a capability-impacting system (150, 155, 160, and/or 165) modifies skill-related information, an external event is triggered 205. For an example using an ORACLE database available from Oracle Corp., as database elements in the database change, a trigger may be executed automatically. The event generates a transaction 210, which in turn triggers a workflow 215. (A workflow is a state table utilized by SIBBEL and other systems.) The workflow 215 updates the centralized capability profile 220. This update triggers a second workflow 225 which in turn initiates an intermediary process to mimic 230 the typically manual administration (i.e., a supervisor using the administrative interface 305) of the agent skill information of the routing system 130. Other embodiments of the present invention use other methodologies to update the skill tracking system 140/145 and to synchronize the routing system 130. For example, in one embodiment, a custom interface automates the changing of agent skills by looking for and processing files sent to the AVAYA Call Management System 130. This is done on an adjustable, periodic interval. When a change is noticed, the interface automatically updates the skill set as appropriate and provides a log that indicates when it has received and processed a file for a skill change.

FIG. 5 is a conceptual diagram of an example agent profile as can be stored in the system. As shown in FIG. 5, several skill/capability scores can be tracked. Each skill has an associated rating. For example, FIG. 5 reflects an agent highly skilled in: (A) Product A, (B) Product B, (C) Sales Business Function and (D) Value Segment D. Some skills may have a Boolean rating in which the skill is either present or not. For example, a foreign language skill such as "Speaks Spanish" may be Boolean since the agent either can speak Spanish or she cannot. Other skill ratings may be a range. Such ratings may be a number (such as between 1 and 5), or a level (such as beginner, intermediate, or advanced), for example. Other ratings can be implemented as well. In some embodiments, profiles are stored for groups of agents instead of for (or in addition to) individual agents. In some embodiments, skill-impacting data is received that is representative of a group of agents rather than for a single agent.

The foregoing description addresses embodiments encompassing various principles of the present invention. The embodiments may be changed, modified and/or implemented using various types of arrangements. Those skilled in the art will readily recognize various modifications and changes that may be made to the invention without strictly following the exemplary embodiments and applications illustrated and described herein, and without departing from the scope of the invention, which is set forth in the following claims.

What is claimed is:

1. A computer-implemented method of maintaining skills for agents of a contact center, the method comprising:
providing profiles in a central skill database for a plurality of agents;
providing a skill-impacting system, the skill-impacting system storing, using a computer system, data for each of the plurality of agents in the central skill database, wherein storing skill data comprises modifying at least one of the profiles, wherein the skill-impacting system includes a learning management educational system, a customer satisfaction scoring system, an a performance metrics scoring system, and wherein the skill data includes satisfaction assessments, completion or results from a training course, and performance metrics;
modifying skill data, wherein the modifying triggers an event which generates a transaction which triggers a plurality of work flows state tables;
receiving from the skill-impacting system skill data for a first agent;
updating, using a computer system, a first profile in the central skill database for the first agent based on the skill data received, wherein the updating is performed by the plurality of workflows state tables; and
selectively synchronizing, using a computer system, routing logic of a routing system, wherein the routing system comprises a routing database, with skill-based information from the first profile in the central skill database such that the routing logic determines which of the plurality of agents are to handle a contact based on at least skill data, wherein conditions that trigger the synchronizing are adjustable, rule-based and independent of the updating, and the central skill database is separate from the routing database.

2. The method from claim 1, further comprising:
receiving a contact from a customer;
processing routing logic in the routing system to select a second agent from the plurality of agents; and
routing the contact to the second agent;
wherein the routing logic includes routing rules and routing source data for performing the step of routing, the routing source data including agent availability and the skill-based information in the routing system.

3. The method from claim 1, wherein synchronizing the routing system is accomplished for a plurality of profiles in the central skill database.

4. The method from claim 1, wherein updating the first profile is triggered when skill data is received from the skill-impacting system.

5. The method from claim 1, wherein synchronizing the routing system is automatically run when triggered by an event.

6. The method from claim 1, wherein synchronizing the routing system is automatically run at a predetermined time interval.

7. The method from claim 1, wherein the skill data is received from a plurality of skill-impacting systems.

8. A computer-implemented method for synchronizing skill data in a contact center, comprising:
maintaining a plurality of profiles in a central skill database corresponding to a plurality of agents, wherein the plurality of profiles comprise skill-based ratings for a plurality of skills;
storing, using a computer system, skill data for each of the plurality of agents in the central skill database of at least one skill-impacting system, wherein the step of storing skill data comprises modifying at least one of the plurality of profiles, wherein the skill-impacting system includes a learning management educational system, a customer satisfaction scoring system, and a performance metrics scoring system, and wherein the skill data includes satisfaction assessments, completion or results from a training course and performance metrics;
modifying, using a computer system, skill data, wherein the modifying triggers an event which generates a transaction which triggers a plurality of workflows state tables;
using the skill data from the at least one skill-impacting system to update, using a computer system, the plurality of profiles in the central skill database, wherein the updating is performed by the plurality of workflows state tables;
maintaining, using a computer system, source data in a routing system for the contact center, wherein the routing system comprises a routing database, and wherein the source data is based on agent skills and configures routing logic to make routing decisions; and
selectively updating, using a computer system, the source data based on agent skills with skill-based ratings in the central skill database for reconfiguring the routing logic, wherein conditions that trigger the updating of the source data are adjustable, rule-based and independent of updating the plurality of profiles, and wherein the central skill database is separate from the routing database.

9. The method from claim 8, further comprising:
identifying at least one contact characteristic for a customer; and
selecting an agent from the plurality of agents for the customer;
wherein selecting comprises processing the routing logic to consider the skill-based ratings of the plurality of agents in view of the at least one contact characteristic.

10. The method from claim 9, wherein selecting further comprises choosing an agent who is a best-fit.

11. The method from claim 8 wherein maintaining the plurality of profiles is triggered by the occurrence of a skill-changing event indicated by the at least one skill-impacting system.

12. A computer-implemented system for maintaining skills for agents of a contact center, the system comprising:
a profile module for providing profiles in a central skill database for a plurality of agents;
a skill-impacting system, the skill-impacting system storing, using a computer system, skill data for each of the plurality of agents in the central skill database, wherein storing skill data comprises modifying at least one of the profiles, wherein the skill-impacting system includes a learning management educational system, a customer satisfaction scoring system, and a performance metrics scoring system, and wherein the skill data includes satisfaction assessments, completion or results from a training course, and performance metrics;
a skill receiver for receiving from the skill-impacting system skill data for a first agent;
a modifying module for modifying, using a computer system, skill data, wherein the modifying triggers an event which generates a transaction which triggers a plurality of workflows state tables;
an updating module updating, using a computer system, a first profile in the central skill database for the first agent based on the skill data received, wherein the updating is performed by the plurality of workflows state tables; and
a synchronization module for selectively synchronizing, using a computer system, routing logic of a routing system, wherein the routing system comprises a routing database, with skill-based information from the first profile in the central skill database such that the routing logic determines which of the plurality of agents are to handle a contact based on at least skill data, wherein conditions that trigger the synchronizing are adjustable, rule-based and independent of the updating, and the central skill database is separate from the routing database.

13. The system from claim 12, further comprising:
a contact receiver for receiving a contact from a customer;
a routing processor for processing routing logic in the routing system to select a second agent from the plurality of agents; and
a contact router for routing the contact to the second agent;
wherein the routing logic includes routing rules and routing source data for performing the step of routing, the routing source data including agent availability and the skill-based information in the routing system.

14. The system from claim 12, wherein the synchronization module synchronizes the routing system with a plurality of profiles in the central skill database.

15. The system from claim 12, wherein updating the first profile is triggered when skill data is received from the skill-impacting system.

16. The system from claim 12, wherein the synchronization module is automatically run when triggered by an event.

17. The system from claim 12, wherein the synchronization module is automatically run at a predetermined time interval.

18. The system from claim 12, wherein the skill receiver receives skill data from a plurality of skill-impacting systems.

19. A computer-implemented system for synchronizing skill data in a contact center, comprising:
a profile module for maintaining a plurality of profiles in a central skill database corresponding to a plurality of contact center agents, wherein the plurality of profiles comprise skill-based ratings for a plurality of skills;
a skill-impacting module for storing, using a computer system, skill data for each of the plurality of agents in the central skill database of a skill-impacting system, wherein the step of storing skill data comprises modifying at least one of the plurality of profiles, wherein the skill-impacting system includes a learning management educational system, a customer satisfaction scoring system, and a performance metrics scoring system, and wherein the skill data includes satisfaction assessments, completion or results from a training course, and performance metrics;
a modifying module for modifying, using a computer system, skill data, wherein the modifying triggers an event which generates a transaction which triggers a plurality of workflows state tables;
a profile maintenance module for using data from the skill-impacting system to update, using the computer system, the plurality of profiles in the central skill database, wherein the updating is performed by the plurality of workflows state tables;

a source data module for maintaining, using the computer system, source data in a routing system for the contact center, wherein the routing system comprises a routing database, wherein the source data is based on agent skills and configures routing logic to make routing decisions; and an update module for selectively updating, using the computer system, the source data based on agent skills with skill-based ratings in the central skill database for reconfiguring the routing logic, wherein conditions that trigger the updating of the source data are adjustable, rule-based and independent of updating the plurality of profiles and the central skill database is separate from the routing system database.

20. The system from claim 19, further comprising:

an identification module for identifying at least one contact characteristic for a customer; and an agent selector for selecting an agent from the plurality of agents for the customer;

wherein the agent selector comprises a processor module for processing the routing logic to consider the skill-based ratings of the plurality of agents in view of the at least one contact characteristic.

21. The system from claim 20, wherein the agent selector further comprises an agent chooser for choosing an agent who is a best-fit.

22. The system from claim 19 wherein the profile module for maintaining a plurality of profiles is triggered by the occurrence of a skill-changing event indicated by the at least one skill-impacting system.

23. A computer program stored on a non-transitory computer-readable storage medium, for execution by a computer for maintaining skills for agents of a contact center, the computer program comprising:

a code segment for providing profiles in a central skill database for a plurality of agents;

a code segment for providing a skill-impacting system, the skill-impacting system storing skill data for each of the plurality of agents in the central skill database, wherein the step of storing skill data comprises modifying at least one of the plurality of profiles, wherein the skill-impacting system includes a learning management educational system, a customer satisfaction scoring system, and a performance metrics scoring system, and wherein the skill data includes satisfaction assessments, completion or results from a training course, and performance metrics;

a code segment for receiving from the skill-impacting system skill data for a first agent;

a code segment for modifying skill data, wherein the modifying triggers an event which generates a transaction which triggers a plurality of workflows state tables;

a code segment for updating a first profile in the central skill database for the first agent based on the skill data received, wherein the updating is performed by the plurality of workflows state tables; and a code segment for selectively synchronizing routing logic of a routing system, wherein the routing system comprises a routing database, with skill-based information from the first profile in the central skill database such that the routing logic determines which of the plurality of agents are to handle a contact based on at least skill data, wherein conditions that trigger the synchronizing are adjustable, rule-based and independent of the updating and the central skill database is separate from the routing database.

24. The computer program from claim 23, further comprising:

a code segment for receiving a contact from a customer;

a code segment for processing routing logic in the routing system to select a second agent from the plurality of agents; and a code segment for routing the contact to the second agent;

wherein the routing logic includes routing rules and routing source data for performing the step of routing, the routing source data including agent availability and the skill-based information in the routing system.

25. The computer program from claim 23, wherein the code segment for synchronizing the routing system synchronizes a plurality of profiles in the central skill database.

26. The computer program from claim 23, wherein updating the first profile is triggered when skill data is received from the skill-impacting system.

27. The computer program from claim 23, wherein the code segment for synchronizing is automatically run when triggered by an event.

28. The computer program from claim 23, wherein the code segment for synchronizing is automatically run at a predetermined time interval.

29. The computer program from claim 23, wherein the skill data is received from a plurality of skill-impacting systems.

30. A computer program stored on a non-transitory computer-readable storage medium, for execution by a computer for synchronizing skill data in a contact center, the computer program comprising:

a code segment for maintaining a plurality of profiles in a central skill database corresponding to a plurality of contact center agents, wherein the plurality of profiles comprise skill-based ratings for a plurality of skills;

a code segment for storing skill data for each of the plurality of agents in the central skill database of at least one skill-impacting system, wherein the step of storing skill data comprises modifying at least one of the plurality of profiles, wherein the skill-impacting system includes a learning management educational system, a customer satisfaction scoring system, and a performance metrics scoring system, and wherein the skill data includes satisfaction assessments, completion or results from a training course, and performance metrics;

a code segment for modifying skill data, wherein the modifying triggers an event which generates a transaction which triggers a plurality of workflows state tables;

a code segment for using the skill data from the at least one skill-impacting system to update the plurality of profiles in the central skill database, wherein the update is performed by the plurality of workflows state tables;

a code segment for maintaining source data in a routing system for the contact center, wherein the routing system comprises a routing database, and wherein the source data is based on agent skills and configures routing logic to make routing decisions; and a code segment for selectively updating the source data based on agent skills with skill-based ratings in the central skill database for reconfiguring the routing logic, wherein conditions that trigger the updating of the source data are adjustable, rule-based and independent of updating the plurality of profiles and the central skill database is separate from the routing database.

31. The computer program from claim 30, further comprising:

a code segment for identifying at least one contact characteristic for a customer; and a code segment for selecting an agent from the plurality of agents for the customer;

wherein the code segment for selecting comprises a code segment for processing the routing logic to consider the skill-based ratings of the plurality of agents in view of the at least one contact characteristic.

32. The computer program from claim 31, wherein the code segment for selecting further comprises a code segment for choosing an agent who is a best-fit.

33. The computer program from claim 30 wherein the code segment for maintaining a plurality of profiles is triggered by the occurrence of a skill-changing event indicated by the at least one skill-impacting system.

* * * * *

UNITED STATES PATENT AND TRADEMARK OFFICE
CERTIFICATE OF CORRECTION

PATENT NO. : 8,112,391 B2
APPLICATION NO. : 10/619917
DATED : February 7, 2012
INVENTOR(S) : Christopher J. Allen et al.

It is certified that error appears in the above-identified patent and that said Letters Patent is hereby corrected as shown below:

Title Page, Item (73) Assignee: "Accenture Global Services GmbH, Schaffhausen (CH)" should read --Accenture Global Services Limited, Dublin 4, IRELAND--.

Claim 1, col. 6, line 22, "an a performance" should read --and a performance--.

Signed and Sealed this
Eighth Day of May, 2012

David J. Kappos
*Director of the United States Patent and Trademark Office*